INVENTOR.
Fred E. Ullery

Dec. 4, 1956  F. E. ULLERY  2,772,538
BLADE FORMATIONS FOR TURBO-MACHINES
Filed July 12, 1952  6 Sheets-Sheet 2

INVENTOR.
Fred E. Ullery

United States Patent Office 2,772,538
Patented Dec. 4, 1956

2,772,538

BLADE FORMATIONS FOR TURBO-MACHINES

Fred E. Ullery, Detroit, Mich.

Application July 12, 1952, Serial No. 298,560

32 Claims. (Cl. 60—54)

This specification includes two related inventions which are disclosed and claimed separately as well as in combination. These inventions relate to novel formations of the blades of one or more bladed members in a rotary power device employing a fluid medium moving through channels partially bounded and circumferentially separated by the blades. The types of rotary devices with which this specification is principally concerned are those known as hydrodynamic drives, in which, the respective arrays of blades of a plurality of bladed co-axial members are arranged in a closed toroidal path for fluid recirculation. These blade improvements are advantageous for the two main classes of hydrodynamic drives; namely, fluid couplings, and torque converters; and especially so, for the latter class. However, it is realized that the utility of each of these blade improvements is not limited to hydrodynamic drives. They are advantageous for some other forms of turbo-machines, such as, centrifugal pumps, centripetal turbines, and propellers; the particular utility therefor being somewhat dependent on the respective fluid channel disposition, as will be obvious throughout this disclosure. Also, it is believed that these blade formations are beneficial for the blades of some forms of compressible fluid turbo-machines.

There are earlier applications relating to inventions some of which are partially disclosed in some of the illustrations of the drawings of this application. These earlier applications are: Serial No. 238,459 filed July 25, 1951, Patent No. 2,762,197 issued September 11, 1956; Serial No. 255,167 filed November 7, 1951, Patent No. 2,762,196 issued September 11, 1956; Serial No. 261,702 filed December 14, 1951; Serial No. 271,550 filed February 14, 1952, Patent No. 2,762,479 issued September 11, 1956; Serial No. 283,090 filed April 18, 1952, Patent No. 2,762,198 issued September 11, 1956; and Serial No. 286,117 filed May 5, 1952.

Also, there is a continuation-in-part application which is Serial No. 313,471 filed October 7, 1952.

A comprehensive objective of these inventions in a hydrodynamic torque converter is to improve the effectiveness thereof relative to the efficiency of, and the capacity for, power transmittal. The increased efficiency affords better economy of operation, and, for a particular output power requirement, permits the use of a smaller, lighter, and less expensive power source. The increased capacity relative to the physical proportions reduces the cost of, the weight of, and the space requirements for, the torque converter component of a particular drive. These attainments are disclosed relative to prior art, with regard to principles and physical forms and relationships, and then are exemplified for various circumstances for which the blades have been constructed to comply with, and to be most efficient for, specific conditions.

One principal invention of this specification concerns a novel and unique configuration of each of an array of blades in a member having a fluid path resembling a portion of a toroidal fluid path; objectively, to minimize the head loss attending the flow of fluid through channels thereof. The fluid passing through each channel is accelerated transversely in both major directions quite uniformly.

For some cambered blades, this blade configuration may be somewhat visualized as an odd portion of the surface of a cone obliquely situated across a portion of a toroidal fluid path, but extensively altered with appropriate modifications. Part of the advantageous influence may be comprehended as being similar to a curved road surface banked to guide a vehicle thereabout, the centrifugal force of the change in direction being counterbalanced by a centripetal component of the acceleration of gravity acting on the vehicle, that component being effected by the inclination of the road surface.

This blade configuration is quite unusual and extraordinary in that, even for a long channel bounded by successive blades and the peculiar contours of shrouds defining a portion of a toroidal fluid path, it serves to provide fluid accelerations which are approximately constant in the two major directions across the channel from near the entrance to near the exit. Furthermore, this blade configuration tends to induce and to sustain an unusual pattern of circulation velocity distribution with which the configuration is interdependent. The induced circulation velocity is approximately proportional to the square root of the distance from the instantaneous center of the toroidal path curvature, being higher along the shell edge of the bladed channel than along the core edge. With this circulation velocity distribution and the particular blade configuration, the blade principal influence—the acceleration of the fluid in a direction tangential to the circumferential velocity about the torque converter axis of rotation so to effect the desired change of the moment of momentum—may be nearly constant over almost all the expanse of the blade surface, between the shell and the core shrouds and from near the entrance to near the exit. The blade configuration has a bias disposition across the toroidal fluid path, suitably maintained from the entrance to the exit, so that, the blade principal influence, not only induces and sustains the particular pattern of circulation velocity distribution, but has a centripetal component towards the center of the toroidal fluid path curvature to properly guide the fluid around that curvature. For the situation described, that centripetal acceleration is correctly a constant from the shell to the core for each section across the channel. Thus, this blade configuration minimizes the fluid turbulence and reduces the circulation head loss which is a principal objective of the invention.

The other principal invention of this specification relates to a novel and unique combination of blade sections and contours at and near to the fluid entrance end of each of an array of blades to better cope with variations of pressure and velocity across a stream of approaching fluid; objectively, to reduce shock head entrance losses, and/or to afford smoother and more efficient transition of the circulation velocity, and the attendant head, of the approaching fluid into the desired distribution in the entrance and receiving channels between those blades. Furthermore, in a torque converter, this invention advantageously increases, for most of the turbine and stator members, the optimum change of curvature from the blade entrance to the blade exit. So, this entrance form invention affords better performance and higher efficiency in a torque converter, not only by reducing entrance losses, but by increasing the optimum change of blade curvature.

Physically, this blade entrance invention contemplates the entrance portion of each blade of an array of blades having modifications in cross-section between the shell and the core shrouds; the entrance portion of the blade cross-section near the mid-stream being relatively thin and tapered in comparison with, the blade cross-section adjacent to the shell shroud, and/or that adjacent to the core shroud. These blade end modifications being appropriately disposed for the specific conditions at the entrance of the particular array of blades, to partially counteract and moderate at and in the bladed entrance, the variations in fluid transition across the fluid path. Usually, the blade entrance cross-section near one of the shrouds is made similar to that near mid-stream, but for some situations, it is desirable to have the blade entrance cross-section near each of the shrouds considerably thicker than that at mid-stream, but usually with the cross-section near one shroud less obtuse than that near the other shroud.

As indicated, these inventions influence the extent of blade curvature and the proporitons of the fluid paths in which the blades are situated. In some of the subsequent explanations and exemplifications, it would seem that these inventions relate only to blade constructions for predetermined blade entrance and exit angles and fluid path proportions; but the advantages of these inventions are contemplated in the determinations of those angles and proportions. Some of the important considerations, in the determination of the disposition of blade angles and the proportions of members and fluid paths, to obtain the most advantageous correlation between various combinations of members in torque converters, are disclosed in my copending applications, as follows: Serial No. 238,459, filed July 25, 1951; Serial No. 255,167, filed November 7, 1951; and, Serial No. 261,702, filed December 14, 1951.

The important fundamental relationships are clearly disclosed hereinafter with aid of, and many embodiments are exemplified in, the appended drawings which are a part of this specification. The drawings are, as follows:

Figures 3, 4, and 5 are cross-sectional views of hypothetical blade arrays.

Figures 10, 11, and 12 are views showing the blade configuration for the second turbine member blade 50.

Figures 19 to 67 incl. illustrate for each of the other six arrays of blades of the torque converter shown in Figure 6, the blade configuration, the blade entrance cross-sectional form, and the biased fluid channel effected, the views of each blade form being as designated by correspondingly numbered lines of each group of illustrations; which are Figures 19 to 27 incl. illustrate a blade 30 for the pump member;

Figures 60 to 67 incl. illustrate a blade 90 for the third stator member;

Figures 68 to 76 incl. illustrate somewhat diagrammatically these blade configuration and blade entrance form inventions in a fluid coupling, in which Figure 68 is a longitudinal half-section through the axis of rotation wherein each separate view of the blades is designated by a correspondingly numbered line;

Figure 69 is a fragmentary axial view of the pump blades 130 with part of the core shroud 133 removed;

Figures 70, 71, and 72 illustrate the pump blade entrance form, respectively, near the shell-stream edge, near mid-stream, and near the core-stream edge;

Figure 73 is a fragmentary axial view of the turbine blades 150 with part of the core shroud 153 removed; and, Figures 74, 75, and 76 illustrate the turbine blade entrance form, respectively, near the shell-stream edge, near mid-stream, and near the core-stream edge;

Figures 77 to 82 incl. illustrate somewhat diagrammatically these blade configuration and blade entrance form inventions in a centrifugal pump, in which

Figures 83 to 88 incl. illustrate somewhat diagrammatically these blade configuration and entrance form inventions in a vertical centripetal turbine, in which—

Figure 83 is a vertical section through the axis of rotation wherein each separate view of a blade is designated by a correspondingly numbered line;

Terminology

Unless otherwise stated, the terms used herein are as recommended and with the meaning as defined in Hydrodynamic Drive Terminology, pages 738–740 incl. of the 1951 SAE Handbook, published by the Society of Automotive Engineers, Inc. Where optional terms are listed, the first is considered preferably and is used in this specification.

As used in this specification, a hydrodynamic torque converter is a drive which, by dynamic fluid action in a closed recirculating path, transmits power with the ability to change torque, and physically comprises: a plurality of coaxial pump, turbine, and stator members, including at least one of each, with mountings to maintain axial spaced relationship and to permit appropriate relative rotation of the members; a fluid system including an adequate fluid supply and suitable fluid control, as well as a cooling means if required; and structural components including, a stationary housing or support structure, a casing with suitable seals, an input power structure, an output power shaft or structure, and a reaction torque structure.

The term "member" is restricted in this specification to mean a bladed wheel member of a turbo-machine, such as, a pump member, a turbine member, or a stator member. Each member has at least one circular array of blades extending across a portion of the fluid path, and defining fluid channels through that portion and between the shell and the core shrouds bounding that portion of the fluid path. Usually, both shrouds are fixed elements of the member, but if desired, the blades may be projected from and supported by one or part of one shroud, the omitted fluid path boundary functions being provided by a separate shroud construction.

Each member is externally associated in accordance with its specific character, being joined by a respective attaching construction to the proper driving, driven, or reaction structure: a pump member is joined to an input power driving structure to cause forward rotation, and to transmit energy to the passing fluid; a turbine member is joined to a driven structure communicating with an output power shaft or structure, enabling it to contribute torque, at least in the forward direction, to the output power shaft; and, a stator member is joined to a reaction structure associated with the stationary housing, enabling it to transmit torque to the stationary housing at least in the backward direction.

In a torque converter, forward rotation is the direction of rotation of the pump member or members. All vector quantities in the forward direction are considered positive, and in the backward direction, negative.

For this specification, the direction of influence on the passing fluid is more directly significant than the respective external associations of the various members. Functionally, pump and stator members vectorially increase, and turbine members vectorially decrease, the moment of momentum of the passing fluid.

"Shroud-stream" refers to a stream layer near and along a shroud surface bounding a fluid channel. "Shell-stream" refers to a shroud-stream near a shell shroud; "core-stream," to that near a core shroud; and, "mid-stream," to a stream layer approximately mid-way between the shell and core shroud surfaces.

The "surface of configuration" of a blade is an imaginary surface midway between the front and back faces of a blade and extending lengthwise between the blade entrance and exit ends, and crosswise between the blade shell-stream and core-stream edges.

The "blade angle" at any point of the blade surface of configuration is the included angle between the tangent to the stream line thereat and a plane which passes through that point and contains the axis of rotation. Blade angles are positive or negative according to the direction of the effected fluid velocity component; positive for a component in the direction of rotation, and negative for a component in the opposite direction.

Figure 1:
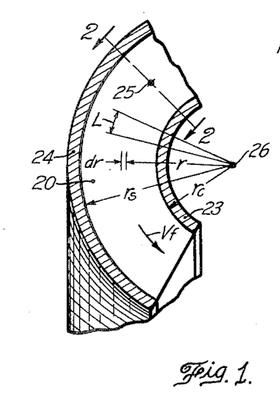
Figure 1 illustrates a section, cut by a plane containing the axis of rotation O'—O', of a hypothetical annular fluid path, which may be a portion of a toroidal fluid path, in which an array of blades 20 extend thereacross between a core shroud 23 and a shell shroud 24.
Figure 2:
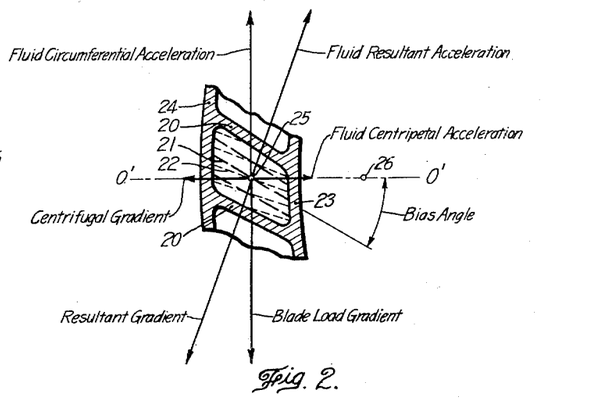
Figure 2 shows a cross-section of a fluid channel at line 2—2 of Figure 1.

A "bias disposition" of a blade is an oblique placement of the blade surface of configuration across the fluid path between the shrouds. The "bias angle," which is the angle of that obliquity at a particular point on the surface of configuration, may be conveniently defined with the aid of two reference planes, as shown in Figures 1 and 2 relative to a point 25 on a stratum layer of the blade surface of configuration across the center of a fluid channel. The first reference plane, shown in Figure 1 as the plane of the paper and in Figure 2 perpendicular to the plane of the paper, contains the axis of rotation O'—O', and not only passes through the particular point, but contains the respective radius of curvature thereat of the toroidal fluid path, the center of curvature of which is point 26. The second reference plane, shown in Figure 1 perpendicular to the plane of the paper and in Figure 2 as the plane of the paper, is perpendicular to the first reference plane and intersects that plane along the designated radius of curvature. The long-dash line 21 through point 25 is the intersection of the second reference plane and the particular stratum layer of the blade surface of configuration; and, the "bias angle" is the included angle between a line tangent to that intersection at point 25 and the first reference plane, as shown in Figure 2.

Although adjacent blades defining a channel have similar bias angles, the blade sides of a channel cross-section are usually oblique with each other. Each blade has its respective reference plane containing the axis of rotation, but those planes are angularly displaced from each other. Also, the plane referred to as the second reference plane in the preceding paragraph is usually oblique relative to the axis, that obliquity changing from section to section along the channel from entrance to exit. So, except for the curvature of the sides, the channel cross-sectional shape is somewhat that of a trapezoid, and that cross-sectional shape continually varies disproportionately from the entrance to the exit of the channel.

Herein, the fluid channel shape is referred to as being, in general, similar to that of a trapezoid to conveniently indicate the general disposition of the four sides, particularly to point out that the blade face sides, except for a singular cross-section of certain channels, are oblique with each other, and that obliquity varies along the channel from entrance to exit. The cross-sectional shape is not strictly that of a trapezoid in that the sides, particularly the shroud sides are not necessarily, and for the most part are not, straight lines.

Bias angles are considered positive or negative according to the direction of the fluid acceleration effected by the component induced from the blade principal influence: that which achieves a centripetal acceleration, towards the respective instantaneous center of curvature of the toroidal fluid path, is a positive bias angle; and that which causes a centrifugal acceleration, away from that designated center, is a negative bias angle.

The "rate of fluid circulation," or the rate of fluid transition, is the volume per unit time passing a particular location, and is usually expressed, cu. ft. per sec. In a closed toroidal fluid path, the rate is simultaneously constant throughout the fluid path.

The "circulation velocity" is the component of the fluid absolute velocity in a plane containing the axis of rotation, and in the direction tangential to the circumferential projection of the stream layer in that plane. It is customary to express the circulation velocity in terms of ft. per sec.

The "circulation path area" is the summation of the circumferential cross-sectional areas of the separate fluid channels around a member, those cross-sections being normal to the direction of the circulation velocity. Hence, for any cross-section directly across the fluid path, the average circulation velocity equals the rate of circulation divided by the respective circulation path area.

The "circumferential velocity" of the fluid, sometimes referred to as the whirl velocity, is the component of the fluid absolute velocity in a plane perpendicular to the axis of rotation and in a direction perpendicular to the direction of the circulation velocity.

A "gradient of pressure" of the fluid across a channel is the rate of change of pressure in the particular direction. For physical significance, it is desirable to express the gradient of pressure as p. s. i. per inch for the particular fluid. The resultant acceleration of the fluid is proportional to the gradient of pressure in magnitude but in the opposite direction, one being reactionary to the other. The acceleration, ft. per sec. per sec., is vectorially equal to $$\frac{\text{Gradient of pressure, p. s. i. per inch} \times \text{Acceleration of gravity}}{\text{Specific weight of the fluid, lbs. per cu. inch}}$$

It is expedient to consider the influence in a channel as separate components in the two major directions across the fluid path, as illustrated in Figure 2.

The "blade load gradient" is the gradient of pressure pertinent to the principal function of the blades, which is to influence the circumferential velocity of the passing fluid so as to effect the desired change of the moment of momentum. So, for pump and stator members, the prevailing blade load gradient is in the backward direction, vectorially effecting a positive acceleration of the passing fluid in the direction of forward rotation; for turbine members, it is in the forward direction, vectorially effecting a negative acceleration which is in the direction opposite to forward rotation.

The "blade load," expressed as p. s. i., is the difference of the pressures on the opposite sides of a blade. For uniformly spaced blades, it is equal in magnitude to the pressure change thereat across the channel, which is, the blade load gradient, p. s. i. per inch times the channel circumferential depth, ins.

A gradient of pressure across a fluid channel perpendicular to the direction of the blade load gradient and in alignment with the respective instantaneous center of curvature of the toroidal path is a "centrifugal gradient" when the direction of pressure increase is away from the center of curvature; and is a "centripetal gradient" for pressure increase towards that center. This specification is principally concerned with centrifugal gradients which effect centripetal accelerations of the fluid.

A "toroidal bend gradient" is a centrifugal gradient to effect a suitable centripetal acceleration of the passing fluid towards the instantaneous center of curvature of the toroidal fluid path, so as to properly direct the fluid around that curvature.

A "circulation balance gradient" is an imaginary gradient of pressure in directional alignment with the toroidal bend gradient. It is expedient for the determination of the bias disposition of the blade surface of configuration, so that the resultant bias disposition provides a pressure differential parallel with that surface across the channel to sustain the particular circulation velocity pattern. For a pattern having a higher circulation velocity along the shell-stream than along the core-stream, the proper circulation balance gradient is a centrifugal gradient of pressure.

*Basic relationships*

The relationship of the bias disposition of the blade surface of configuration at any location and the gradients of pressure thereat, to properly direct the fluid around the toroidal path curvature, and to sustain the desired pattern of circulation velocity, expressed in equation form is arc tan bias angle equals $$\frac{\text{Toroidal bend gradient plus circulation balance gradient}}{\text{Blade load gradient}}$$

(a)

As will be presently shown for a certain combination of relationships, the bias angle may be almost constant across the channel from the shell-stream to the core-stream.

The nature of the resultant pressure distribution in such a biased channel is more comprehensible when considered along strata levels across the fluid channel, each stratum being one of a series of layers of imaginary blade surfaces of configuration across the channel, as shown by the long-dash lines 21 in Figure 2. Of course, there is a change of pressure from one stratum level to another, inasmuch as the pressure falls across the channel from the high pressure side of one blade to the low pressure side of the next blade. If the circulation balance gradient factor is omitted from Equation (a), and the bias angle determined is only the relationship between the toroidal bend and the blade load gradients, the blade disposition would be somewhat as shown by the short-dash strata lines 22, and the pressure along any one of those lines is constant from the shell-stream to the core-stream. The inclusion in Equation (a) of a circulation balance gradient for a pattern of circulation velocity higher along the shell-stream than along the core-stream, increases the bias angle of the blade surface of configuration and of the strata layers thereof, shown as long-dash lines 21 in Figure 2; and, along any one of those lines, the pressure increases from the shell-stream to the core-stream to compensate for the reduction of the circulation velocity. Thus, the bias disposition not only directs the passing fluid around the toroidal path curvature, but sustains the particular pattern of circulation velocity.

These pressures are relative to a datum pressure which is the pressure head factor of the power or gross head. Actually that datum pressure varies considerably across each of most of the channel cross-sections, being in accordance with, and in balance with, the physical circumstances. That is, the datum pressure variation across a channel cross-section is a maintained field differential which singularly does not tend to induce cross flow.

The pattern of circulation velocity distribution across a particular channel cross-section may be expressed in equation form, $$Vf \text{ equals } (K \times r)^n \qquad (b)$$

where: $Vf$ is the circulation velocity along the stream layers in ft. per sec.; $r$ is the respective radial distance in inches of the stream layers from the center of the toroidal path curvature; and, $K$ is a constant, the value of which may be determined for any cross-section in accordance with the specific relationships near mid-stream, where the circulation velocity is approximately the average for the respective cross-section.

As will now be shown, it has been discovered that the pattern of circulation velocity for which $n$ equals 0.5 in Equation (b) tends to afford a blade surface of configuration which, even for a long channel around the peculiar contours of a toroidal fluid path, transversely accelerates the passing fluid rather uniformly throughout the confines of the channel. This disclosure reveals the nature of the pressure gradients, the trend of the bias disposition across the fluid path, and the tendency of the shell-stream and the core-stream edges to progress angularly around the axis of rotation so as to maintain the proper bias disposition along the channel from the entrance to the exit.

Referring to Figure 1, the equation for the total change of centrifugal pressure, $Pr$, across a channel cross-section from the core radius, $rc$, to the shell radius, $rs$, is fundamentally, $$Pr \text{ equals } \int_{rc}^{rs} \frac{(Vf)^2}{C'} \frac{dr}{r} \qquad (c)$$

in which the gradient of pressure equals $$\frac{(Vf)^2}{C'r} \qquad (d)$$

For a fluid having a specific gravity of 0.825, and with $Pr$ expressed in p. s. i., $Vf$ in ft. per sec., and $r$ in inches, the value of the constant $C'$ is approximately 90.

Substitute in Equations $(c)$ and $(d)$: 90 for $C'$; and for $Vf$ according to Equation $(b)$, with $n$ equal 0.5; and solve. Whence: $Pr$ equals $K(r_s-r_c)/90$; and the gradient of pressure is $K/90$. Hence, for a channel cross-section having the circulation velocity varying as the 0.5 power of the radius of curvature of the toroidal fluid path, the toroidal bend gradient should be a constant centrifugal gradient of pressure providing a centripetal acceleration of the fluid which is constant across the channel from the shell-stream edge to the core-stream edge.

The circulation balance gradient should be a centrifugal gradient of pressure having the same rate of pressure change as that of the pressure equivalent of the kinetic energy of the circulation velocity across the fluid path, so as to effect a bias disposition having the reverse pressure change along strata layers across the channel to compensate for the change of the kinetic energy, as explained in the paragraph following Equation $(a)$. The kinetic energy head expressed in ft. is $(Vf)^2/2g$. Expressed in accordance with the convenient system of units of the preceding paragraph, the kinetic energy pressure, p. s. i. equals $(Vf)^2/180$. Substituting the value of $Vf$ from Equation $(b)$ with $n$ equal 0.5, the kinetic energy pressure, p. s. i. equals $Kr/180$, whence the gradient of pressure, which is the same as the circulation balance gradient, is $K/180$. Hence, for a channel cross-section having the circulation velocity varying as the 0.5 power of the radius of curvature of the toroidal fluid path, the imagined circulation balance gradient is a constant centrifugal gradient of pressure having a magnitude one-half that of the toroidal bend gradient.

It has been found that, with a pattern having the circulation velocity varying as the 0.5 power of the instantaneous radius of curvature, the blade load gradient may be quite uniform from the shell-stream to the core-stream across each cross-section of the channel. All of the gradients of pressure being constants across each cross-section of the channel, the bias angle across each cross-section is also nearly constant, providing blade faces thereacross which are approximately straight.

The blade load gradient may be varied from section to section between the channel entrance and exit, if desired; but, for torque converter blades, it is preferable to maintain a somewhat uniform blade load gradient from near entrance to about the exit.

Development of blade configuration

For torque converter blades, it is preferable to develop the blade surfaces of configuration for the conditions at about 0.75 speed ratio of the output speed to the input speed, so as to favor the coupling phase of operation which is more prevalent usage than that near stall. However, it has been found that the variation of the blade action in the channels over the full range of operation is less than would be expected; also, that this particular blade form complies with the changing circumstances much better than conventional forms.

For a blade of a torque converter, or of a fluid coupling, it is advisable to maintain the blade loading for almost the full length of the blade to maintain the guidance of the fluid around the curving toroidal path and to sustain the circulation velocity pattern. It is desirable, of course, at entrance and at exit to appropriately modify the blade load gradients to provide a smooth transition of the stream pattern from a preceding member and to a following member in the fluid path; and/or to accommodate a change in the curvature of the toroidal fluid path.

For the blades of a centrifugal pump, or those of a centripetal turbine, the blade surface of configuration may be continued for a short distance into a straight portion of the fluid path, in which, the blade load gradient is eased off to give a smooth discharge flow; the bias disposition is maintained to the exit but it has little influence there, inasmuch as its effect is a component of the blade load gradient which is eased off at that exit.

Using the blade load gradient pattern desired from the entrance to the exit, the blade angular curvature is determined along the mid-stream layer of the particular portion of a toroidal fluid path between predetermined entrance and exit angles of the blade. Whence, in accordance with the gradient and the bias angle relationships disclosed, the blade configuration is established. Then the blade load gradients along the shell-stream and core-stream edges of that configuration may be checked. If desirable, modifications may be effected by altering the blade load gradient along the mid-stream layer, which, not only changes the curvature therealong, but modifies the bias angles across the altered portions of the blade.

This blade configuration has different blade curvatures along the respective stream layers, but the curvature is gradually blended from the shell-stream edge to the core-stream edge. That is, the blade curvature changes across each channel cross-section, so as to maintain, with the changing circulation velocity, similar transverse accelerations for each stream layer of the cross-section. Relative to the average blade curvature from the entrance to the exit along the mid-stream, the average curvature along the shell-stream edge is considerably milder, and that along the core-stream edge is considerably stronger. Except when the entrance and/or the exit form is unusually modified for fluid transition from or to other members, or for a change in fluid path curvature, the total blade angle change from the entrance to the exit is smaller along the shell-stream edge, and larger along the core-stream edge, than that along the mid-stream.

The length of a toroidal fluid path section is normally longer along the shell-stream edge than along the core-stream edge. For the section shown in Figure 1, the increment length L varies directly as the radius of curvature of the toroidal fluid path. This length trend is offset by the trend of the blade average curvature, so that, along each stream layer, from the shell-stream edge to the core-stream edge, the blade surface circumferential progression around the axis of rotation is in accord to maintain the desired bias disposition for all the channel cross-sections from the entrance to the exit.

Hitherto, blade forms have been based on the assumption that the circulation velocity along the core-stream edge was higher than, or at least equal to, that along the shell-stream edge. Consequently, the blade average curvature from entrance to exit has been too high along the shell-stream edge, and too low along the core-stream edge, to conform properly with the physical contours of a toroidal fluid path. That is, it is customary for the circumferential progression around the axis of rotation to be so discordantly higher along the shell-stream edge than along the core-stream edge, that the resultant blade surface of configuration is warped with a twisting bias disposition along the fluid path; in fact, it is quite common for a torque converter blade to have a bias disposition which varies along the stream layers from a strong negative bias to an excessive positive bias.

Figures 6, 7:
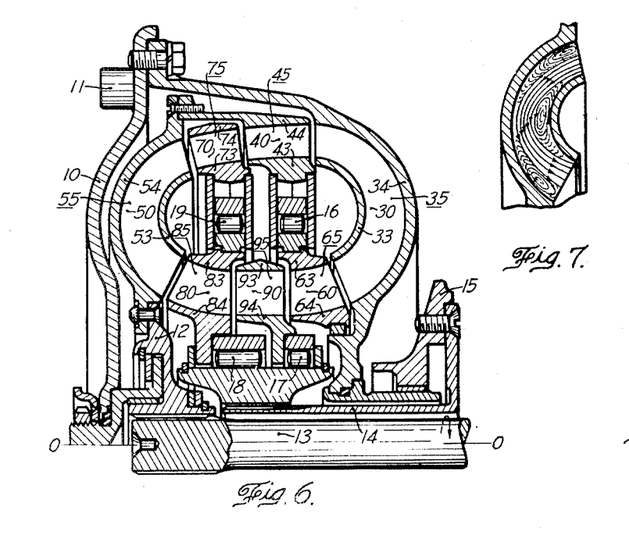
Figure 6 is a longitudinal half-section through the axis of rotation of a torque converter having seven members for each of which the respective blade form is subsequently illustrated, the particular torque converter being exemplified so as to afford a comprehensive disclosure of blade forms for various situations in a toroidal fluid path.
Figures 7 and 8 diagrammatically illustrate, using the fluid path section of the second turbine member 55 of Figure 6, turbulent flow, and the eddies thereof, fostered respectively by two common types of blade disposition.
Figure 8:
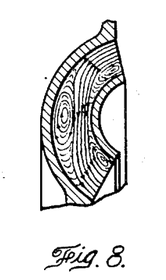

Figures 7 and 8 illustrate two types of turbulent flow, and eddies thereof, in a channel of a curving portion of a toroidal fluid path. Figure 7 shows the flow in a channel having a zero bias angle disposition, as commonly used for fluid couplings. The flow is unsteady: the eddies may be continuously progressive along the channel; they may be intermittently formed and swept away; or, for certain flow conditions, they may be maintained. Figure 8 illustrates the type of turbulence fostered by a channel having a twisting bias disposition, which is positive in an excessive degree at the entrance and at the exit, but is zero or even negative in an intermediate portion of the channel. That form of channel is quite common for the principal turbine member of most torque converters.

To reduce the range of this detrimental twist of the bias disposition, it has been common practice to shorten the blades along the shell-stream edge, leaving, unbladed, a considerable portion of the fluid path therealong between the exit and the entrance blade tips of successive members. That construction has certain detrimental effects in a torque converter: the useful blade surface is reduced, the average magnitude of the required blade load gradient being somewhat in inverse ratio to the effective blade area; the guidance of the fluid is interrupted, thereby fostering turbulence; and, if the unbladed gap has a radial trend relative to the axis of rotation, the range of the shock velocity and the shock angle is increased, not only by the greater differential of the circumferential velocities of the adjacent members, but also by the change of the circumferential velocity of the fluid along the unbladed path, that change being free vortex flow with the circumferential velocity varying inversely as the radius.

As has been explained, the circulation velocity pattern, having the circulation velocity varying as the 0.5 power of the radius of curvature of the toroidal fluid path, may be considered idealistic with regard to uniform accelerations of the passing fluid, and the conformity of the blade surface of configuration with the contours of a toroidal fluid path. With regard to turbulent losses, the pattern may be modified somewhat from the idealistic with only a rather insignificant increase in those losses. The surface drag loss of the fluid passing through the channels is somewhat less for a more uniform pattern. So, in accordance with the comprehensive objective of attaining the best overall efficiency, it is preferred that the pattern of circulation velocity should be that having the circulation velocity varying as the 0.4 power, or as low as the 0.3 power, of the radius of curvature of the toroidal fluid path. Of course, that departure from the 0.5 power is limited to the situations where the particular blade configuration may be properly accommodated in its respective portion of the fluid path. Also, that departure from the idealistic tends to reduce the bias disposition, thus effecting a reduction in the wetted surface area of the channels; for that reason, it is usually advisable to restrict the bias angle to forty-five degrees or less.

*Conformity with torque converter environment*

Hitherto, various forms and types of blades have been contrived for torque converter members arranged in a toroidal fluid path curving with changing axial and radial trends relative to the axis of rotation. Seemingly, the inventions of prior art are, in general, adaptations of blade forms and contours which either have proven advantageous forms for blades of other devices operating in different circumstances, or have been separately developed in distinctly different environments. Those forms have been subsequently improvised by warping and twisting to fit in a toroidal fluid path.

The blade forms disclosed in this specification have been devised and developed to comply with, and to be most efficient for the specific conditions in a hydrodynamic torque converter. But, as previously stated, it is realized that some of the conditions exist in varying degrees in other turbo-machines, and that these blade inventions, separately and/or in combination, have utility in some of those turbo-machines; of course, with appropriate modifications which are obvious from the explanations of the principles disclosed herein. However, in a hydrodynamic drive, particularly in a hydrodynamic torque converter, the environment and circumstances are distinctly different, at least in degree, with respect to features, influences, and behaviors, from those of other turbo-machines; some, conveniently so.

In a torque converter, cavitation is less of an influence on blade form than in many other turbo-machines. The fluid medium surrounding, and in, the toroidal fluid path is maintained under sufficient pressure to avoid significant impairment of efficiency by cavitation. So, the blades may be contoured to be the more appropriate for other factors.

In a torque converter, a small quantity of fluid is maintained in a state of rapid recirculation in a toroidal path which is usually referred to as a closed circuit, inasmuch as the rate of replacement of that fluid is small in comparison with the rate of circulation therein. In other turbo-machines the fluid is transient, being received and discharged at a rate approximately the same as that of fluid circulation through the blades; hence, the kinetic energy of the fluid turbulence in the discharge stream is completely lost. Accordingly, it is usually beneficial to contour the blades of a transient flow device so as to effect, along the stream layers from entrance to exit, a nonuniform blade load gradient, the entrance and the mid portion of each blade having the major influence, and the exit portion serving to ease off the blade load gradient of pressure circumferentially across the channels, to equalize and smooth out the stream at discharge; the saving in exit turbulence being greater than the loss incurred by the high degree of turbulence caused along the entrance and mid portions of the blades by the localized high rate of acceleration. In the closed circuit of a torque converter, that type of blade influence sets up an alternating state of turbulence around the circuit; each array of blades effecting a complete cycle of variation in the degree of turbulence, being excessively high along the entrance and mid portions, and below average along the exit portions. Furthermore, the turbulence associated with fluid transition from one array of blades to another further aggravates and is superimposed on that alternating state of turbulence.

Blades which are contoured to exert a rather uniform rate of transverse acceleration along the fluid stream from near the entrance to about the exit, have proven more efficient for torque converters, that is, the actual mechanical efficiency of power transmission is better with that type of blade, indicating that it is best to strive to maintain a uniform state of turbulence throughout the circuit with the minimum of deviation from the inevitable average state of turbulence. So, it has become customary to contour torque converter blades with the prevailing curvature trend continued to the exit with little or no moderation from that trend.

Another distinction between torque converters and transient flow turbo-machines, which partially accounts for the superiority in torque converters of blades contoured to exert uniform acceleration, is the difference of the fields into which the streams are discharged. In the transient flow devices, the stream is usually discharged into a rather homogeneous medium of the particular fluid; but in a torque converter, the stream is discharged directly into the blade entrance of the succeeding member. Blades which maintain to their exits considerable circumferential acceleration of the fluid, essentially, effect a proportionate gradient of pressure circumferentially across the stream of each channel. Relative to a homogeneous medium at discharge, that gradient of pressure represents the variations of the pressure drop from each channel into that homogeneous medium, and, for the stream flow from each channel, indicates the discharge velocity pattern which is thereby induced and established, the discharge velocity of each stream being graduated circumferentially; thereby, causing a disturbing difference between the discharge velocities of the confluent stream layers issuing from the opposite sides of each blade. In a torque converter that detrimental influence, caused by blades which maintain to their exits considerable circumferential acceleration of the fluid, is much less, inasmuch as the bladed entrance of the succeeding member discourages and averts that discharge velocity pattern. That influence of the circumferential gradient of pressure is averted considerably by the circumferential mismatch of the channels of adjacent members, usually, somewhat as follows: a different number of blades are used for adjacent arrays so that the channels are somewhat deeper circumferentially in one than the other; the blades of one array are disposed across the toroidal fluid path with a different bias angle from that of the other; and, the adjacent members rotate at different speeds, the channels of one cutting across the channels of the other. Also, for some adjacent members, the direction of the circumferential gradient of pressure is the same.

Another distinction between torque converters and many other turbo-machines is the relative intensity of the blade influence on the fluid. In a torque converter the intensity of the blade principal influence is essentially high. It is customary for that blade influence to average, throughout the bounds of a fluid channel of a member, a rate of acceleration in excess of five hundred times the acceleration of gravity. Obviously, the fluid circulation is turbulent flow. The degree of turbulence caused, and the attendant eddies and losses thereof, are fundamentally related to and associated with the magnitude of the acceleration and the disparities from the required average rate of acceleration; and, that being a high rate, a relatively small disproportion therefrom tends to be a disparity of considerable magnitude and importance. To minimize these disparities, it is essential, not only to apportion the fluid path to the various members so that the required average rate of fluid acceleration through each is of similar magnitude, but to attain a uniform rate of acceleration in the channels of each member, from near the blade entrance to about the blade exit and along all stream layers from the shell-stream to the core-stream. Hitherto, the latter attainment has seemingly entailed an impossible physical construction; that is, a blade configuration extending for considerable length along, and between, the peculiar contours of a toroidal fluid path, and having and maintaining in combination along a channel thus bounded, the blade curvature, the blade disposition, and the induced and sustained stream pattern of circulation velocity distribution, whereby to impart to the fluid passing through the channel, not only an acceleration, in the direction tangential to the circumferential (whirl) velocity about the torque converter axis of rotation, which is quite uniform throughout almost all the confines of the channel, but also the correct centripetal acceleration towards the instantaneous center of the toroidal path curvature to properly guide the fluid around that curvature. The blade configuration invention of this specification is a practical embodiment of those features, principles, and influences.

Still another distinction between torque converters and most other turbo-machines is that torque converters are functionally intended to operate and to perform effectively over a very wide range of speeds and/or power loads. Consequently, the nature of the fluid transition between the exit and entrance blade tips of successive members varies widely. Also, relative to the nature of the fluid transition at the mid-stream, there is considerable disparity therefrom across the fluid path; that is, the fluid transition at the shell-stream and/or that at the core-stream usually is considerably different from that at mid-stream.

These disparities across the fluid path from the fluid transition at mid-stream include: variations in the fluid whirl velocity transition, called shock velocity, and the attendant angle of obliquity of the fluid impingement on the blades, known as the shock angle; and, the variations in the transition of the circulation velocity, particularly those induced by the variations across the fluid path of the circulation head pressure drop. Inasmuch as the head losses are approximately proportional to the second power of relative velocities and the second power of velocity changes, considerable reduction in head losses is attained by providing blade entrance modifications to partially counteract the specific disparities at each member entrance. Apparently, the extent of the detrimental influences, of the variation across a fluid path from the fluid transition at mid-stream, have not been realized; at least, so far as is known, the blade entrance form of this specification is the first entrance form devised with appropriate modifications to comply with those variations.

*Blade entrance form*

As previously stated, the blade entrance form invention of this specification is a modified-section entrance form having known thin and tapered, parabolic, and/or rounded blade entrance cross-sections advantageously combined and blended to comply with the physical variations across an approaching stream.

Figure 3:
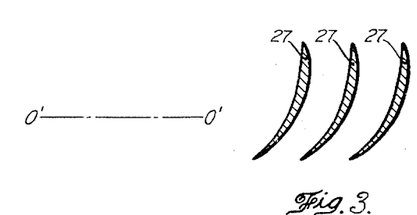
Figure 3 illustrates a rather thin and tapered blade entrance cross-sectional form 27.
Figure 4:
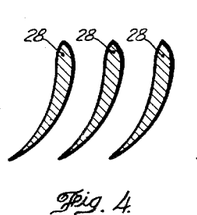
Figure 4 illustrates an entrance cross-sectional form 28 which is considerably thicker and more obtuse, having an outline form which is somewhat parabolic.
Figure 5:
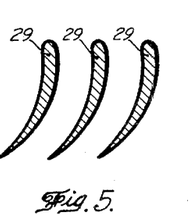
Figure 5 illustrates a rounded entrance cross-sectional form 29 which is obtuse to the extent of being blunt.

Figures 3, 4, and 5 are views of hypothetical blades illustrating in Figure 3, a thin and tapered blade entrance form; in Figure 4, a parabolic blade entrance form which is thicker and more obtuse; and in Figure 5, a rounded blade entrance form which is obtuse to the extent of being blunt.

Some of the relative merits of thin and tapered entrance cross-sections, and thicker and more obtuse entrance cross-sections, such as parabolic shapes and rounded forms, are generally known in the art. That is, a thin and tapered entrance cross-section is more efficient for receiving fluid where the major directional trends, of the fluid before and after reception, are in agreement, that is, when the fluid deflecture at the blade entrance does not exceed a medium-size shock angle; but a thicker and more obtuse cross-section is more efficient where the fluid entrance deflecture is that of a large-size shock angle of fluid impingement. Also, relative superiority is influenced by the circumferential depths of the particular channels; the thin and tapered cross-section tending to be more favorable for channels of small circumferential depth.

The recent trend in the art has been to use blades having a thin and tapered entrance cross-sectional form, and with that form maintained quite uniformly across the fluid path from the shell-stream edge to the core-stream edge; and to avoid extreme shock angles, and the large losses thereof, by restricting the magnitude of, and sacrificing the extent of, the change of curvature from the entrance to the exit of each of the separate arrays of blades of most of the turbine and the stator members.

The blade entrance form of this specification provides a relatively thin and tapered cross-sectional form near the mid-stream; but, towards one or both of the shroud-stream edges, where the fluid transition, relative to that near mid-stream, involves a wider range of shock angle or a larger circulation head pressure drop, that blade cross-sectional form is gradually modified to a thicker and more obtuse form. That modification from near mid-stream to near either or both of the shroud-stream edges should be gradual, preferably changing as the second power of the distance from mid-stream, rather than changing as a linear modification. Thus, a rather thin and tapered blade entrance form is provided across a major portion of the fluid path.

The parabolic entrance form, somewhat as shown in Figure 4, is quite advantageous near a shroud-stream edge where the fluid transition involves a circulation head pressure drop which is considerably greater than that near mid-stream. An acceleration to a higher circulation velocity therealong that shroud-stream is inevitable; but, with a relatively thick blade section, the fluid path area there is reduced, and that local increase of the circulation velocity occurs with less reduction of the circulation velocity along the opposite shroud-stream which, otherwise, may reduce to the extent of being in the reversed direction, which would be a local eddy. For a torque converter, the extent of this pressure drop disparity varies for the different phases of operation, and the parabolic blade form is preferably to the more obtuse rounded form, in that, the pressure to velocity conversion is obtained more smoothly and the more pointed tip is less detrimental in phases of operation not needing the thick blade section.

For blade entrances situated in sections of the toroidal fluid path radially remote from the axis of rotation, the blade entrance cross-sectional form near one of the shroud-stream edges should be a parabolic form which is thicker and more obtuse than the rather thin and tapered entrance form near mid-stream, which for some blade entrances should be maintained from mid-stream to near the opposite shroud-stream. But, for some entrance conditions, it is desirable to have a rounded entrance form near that opposite shroud-stream edge.

For blade entrances situated in sections of the toroidal fluid path radially near the axis of rotation, the circumferential depth of the channels is small along the shell-streams; hence, the blade entrance cross-sectional form near the shell-stream edge should be a rather thin and tapered entrance form, approximately, the same as that near mid-stream. Near the core-stream edge, a considerably thicker and more obtuse entrance form of a parabolic type is usually preferable.

The entrance loss of each stream layer tends to be proportional to the second power of the respective velocity change entailed; so, the losses moderated by this blended combination of blade entrance forms are those which, otherwise, would be the most detrimental. Hence, for a torque converter, this blade entrance form invention, appropriately adapted to the blades of the members thereof, very effectively improves the efficiency of operation and increases the capacity for power transmittal. It is doubly effective in that it, not only effects considerable improvement by moderating those extremely detrimental losses, but increases the optimum change of blade curvature from entrance to exit which is predominantly governed by the magnitude of the extreme losses.

*Description of exemplifications*

Inasmuch as the principles and some of the advantages of these blade configuration and blade entrance cross-sectional form inventions have been clearly disclosed and explained, the description of each of the various exemplifications is largely confined to a recitation of the structural appurtenances, and to observations of the particular blade adaptation peculiar to the respective situation.

Figure 6 is a longitudinal half-section through the axis of rotation of a torque converter having seven members; namely, one pump member, three turbine members, and three stator members. This particular combination of members is illustrated because it entails a variety of blading situations in a toroidal fluid path; and, the ensuing exemplifications of a blade of each array afford a comprehensive disclosure of both of the principal inventions of this specification.

The circumferential projection of each array is shown in Figure 6; the circumferential projection of an array being the rotational intersection thereof in a plane containing the axis of rotation.

The blade arrays, in sequence as arranged in the fluid path in the direction of fluid circulation from the pump member entrance, are: the blades 30 of the pump member 35, the blades 40 of the first turbine member 45, the blades 70 of the first stator member 75, the blades 50 of the second turbine member 55, the blades 80 of the second stator member 85, the blades 90 of the third stator member 95, and the blades 60 of the third turbine member 65.

The pump member shell shroud 34 and extensions thereof serve as part of the rotary casing, being attached to the casing cover 10 which is joined to the power source by knobs 11.

The three turbine members are associated structurally in series. The second turbine member shroud 54 has two extensions: a radially inward extension is attached to the hub 12 which is rotationally secured to the torque converter output shaft 13; and a radially outward extension is securely connected to an extension of the first turbine member shell shroud 44. A one-way device 16, interposed between the first turbine member core shroud 43 and the third turbine member core shroud 63, prevents forward but permits backward rotation of the third turbine member relative to the first turbine member, the functional effect being relative to the torque converter output shaft.

The three stator members are associated with the hollow reaction shaft 14 which is shown fastened to the stationary support structure 15 in a diagrammatical, but a functionally representative, manner. One-way device 17, interposed between the reaction shaft and the third stator member shell shroud 94, renders the third stator member firm backwardly but yieldable forwardly. Similarly, one-way device 18, interposed between the reaction shaft and the second stator member shell shroud 84, renders the second stator member firm backwardly but yieldable forwardly. And, one-way device 19, interposed between the second stator member core shroud 83 and the first stator member core shroud 73, renders the first stator member firm backwardly but yieldable forwardly relative to the second stator member, the functional effect being relative to the stationary support structure 15.

Figures 9 to 67 incl. disclose the form features of the blades which are designed for the conditions at 0.75 speed ratio. Some of the views have arcuate shaped arrows marked FR to indicate the vectoral direction of forward rotation which is that of the pump member.

The form of the blade configuration for each of the members is adapted to take into account not only the immediate fluid path curvature but also the adjacent preceding and following curvature transitions. As illustrated, the blades of five of the members have bias dispositions for which in each configuration the angle of bias is maintained positive and of substantial magnitude over the blade expanse, the particular blades being: pump blades 30, second turbine blades 50, third turbine blades 60, first stator blades 70, and second stator blades 80. That particular form of blade configuration having an angle of bias maintained positive is not used for the blades of the other two members, first turbine blades 40 and third stator blades 90, for the reasons stated hereafter in the respective descriptions.

Figures 9, 10, 11, 12, 13, 14, 15, 16, 17, 18:
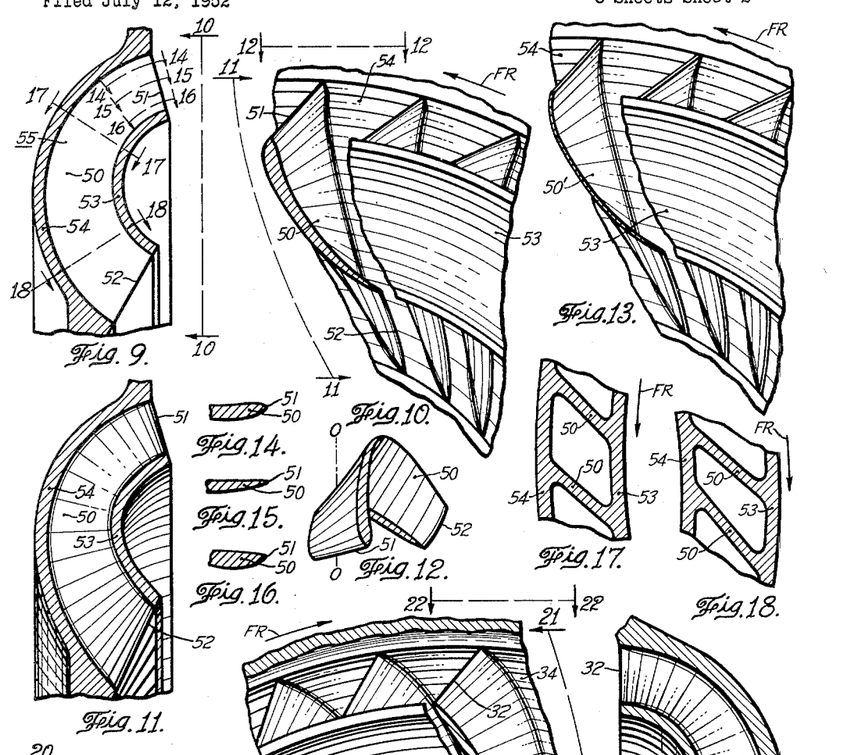
Figure 9 is an enlarged view of the second turbine member section illustrated in Figure 6, that member being the principal turbine member.
Figure 10 is an edge view looking forwardly in alignment with the axis of rotation.
Figure 11 is a face view indicated by line 11—11 in Figure 10.
Figure 12 is a top view designated by line 12—12 in Figure 10.
Figure 13 is a view similar to that of Figure 10 illustrating blades of uniform thickness.
Figures 14, 15, and 16 show, for the blade entrance end of the second turbine member, the blade cross-sectional contours near, the shell-stream edge line 14—14, the mid-stream line 15—15, and the core-stream edge line 16—16, respectively, as designated by lines so numbered in Figure 9.
Figures 17 and 18 show, for the second turbine member, the fluid channel cross-sectional shapes circumferentially across a channel, respectively, at lines 17—17 and 18—18 in Figure 9.

Figures 9 to 18 incl. illustrate the form features of the second turbine member blades 50, each of which extends across the fluid path from the shell shroud 54 to the core shroud 53, and curves lengthwise from a small positive blade angle at the entrance tip 51 to a large negative blade angle at the exit tip 52. Figure 9 is an enlarged view of the particular fluid path section which, except as otherwise stated, designates the locations of the blade and channel views and cross-sections by lines bearing numbers corresponding to the figure numbers.

Figure 10 is a fragmentary axial view of the member with a portion of the core shroud removed to show an edge view of a blade; and, as indicated by lines 11—11 and 12—12 thereof, Figure 11 is a face view and Figure 12 is a top view. The disclosed configuration is devised at 0.75 speed ratio to guide the fluid around the curvature of the toroidal fluid path and to induce a pattern of circulation velocity varying approximately as the 0.5 power of the radius of curvature.

Figure 13 is a view similar to that of Figure 10, but illustrating blades 50' formed of stock of uniform thickness. This illustration is included to emphasize that the blade configuration invention may be utilized independently of the blade entrance form invention.

Relative to the fluid transition at the second turbine entrance near mid-stream, the circulation head pressure drops and the entrance shock angles are higher near the shell-stream edge for some phases of operation, but for other phases, they are higher near the core-stream edge. Accordingly, the blade entrance cross-sectional form is modified in both directions across the fluid path from a rather thin and tapered form near mid-stream, as illustrated in Figure 15, to considerably thicker and more obtuse cross-sectional forms near the shell-stream edge as shown in Figure 14, and near the core-stream edge as shown in Figure 16.

Figures 17 and 18 respectively show the biased and somewhat trapezoidal channel shape for locations designated by lines 17—17 and 18—18 of Figure 9. These illustrations indicate the disproportionate variations of the channel cross-sectional shape; for the particular fluid channels, the obliquity of the trapezoidal shape reverses from the entrance to the exit.

Figures 19 to 27 illustrate the form features of the pump member blades 30, each of which extends across the fluid path from the shell shroud 34 to the core shroud 33, and curves non-uniformly lengthwise from a medium-size negative blade angle at the entrance tip 31 to a small negative blade angle at the exit tip 32. The blade angle non-uniformly to compensate for the changing axial and radial trends of the fluid path, so as to afford a rather uniform blade load gradient from near the entrance to near the exit. Figure 19 is an enlarged view of the particular fluid path section which, except as otherwise stated, designates the locations of the blade and channel views and cross-sections by lines bearing numbers corresponding to the figure numbers.

Figure 20 is a fragmentary axial view of the pump member with a portion of the core shroud removed to show the edge view of a blade; and, as indicated by lines 21—21 and 22—22 thereof, Figure 21 is a face view and Figure 22 is a top view of a blade. The configuration is devised at 0.75 speed ratio to guide the fluid around the curvature of the toroidal fluid path and to maintain a pattern of circulation velocity varying approximately as the 0.4 power of the radius of curvature.

At the pump entrance, the fluid channel circumferential depth is considerably larger, and the range of shock angles tends to be greater, near the core-stream edge than near the shell-stream edge. Accordingly, the blade entrance cross-sectional form is preferably maintained rather uniformly thin and tapered from near the shell-stream edge, Figure 23, to near the mid-stream, Figure 24; thence, it is gradually modified to a thicker and more obtuse cross-sectional form near the core-stream edge, somewhat as illustrated in Figure 25.

Figure 26:
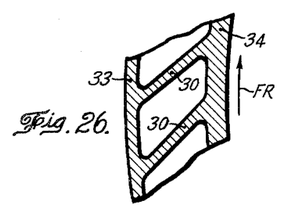
Figure 27:
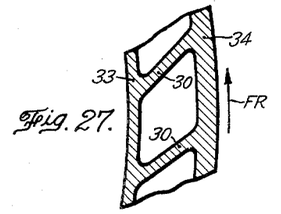

Figures 26 and 27 respectively show the biased and somewhat trapezoidal channel shape for locations designated by lines 26—26 and 27—27 of Figure 19.

Figure 28:
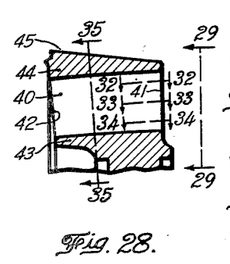
Figures 28 to 35 incl. illustrate a blade 40 for the first turbine member.

Figures 28 to 35 incl. illustrate the form features of the first turbine member blades 40, each of which extends across the fluid path from the shell shroud 44 to the core shroud 43, and curves lengthwise from a medium-size positive blade angle at the entrance tip 41 to a very small negative blade angle at the exit tip 42. Figure 28 is an enlarged view of the particular fluid path section which, except as otherwise noted, designates the locations of the blade and channel views and cross-sections by lines bearing numbers corresponding to the figure numbers.

Figure 29:
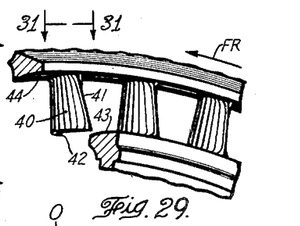
Figures 30, 32, 33:
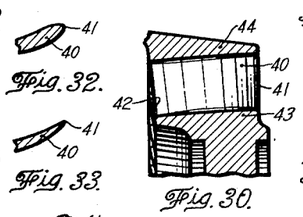
Figure 31:
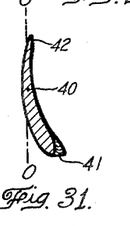

Figure 29 is a fregmentary axial view of the member looking into the channel entrances; and, as indicated by lines 30—30 and 31—31 thereof, Figure 30 is a face view and Figure 31 is a top view of a blade. The blade configuration twists from a negative bias disposition at the entrance, as shown in Figure 29, to almost a zero bias, or radial disposition, near the exit, as illustrated in the channel cross-section view of Figure 35 at line 35—35 of Figure 28. The zero bias disposition is in accord with the insignificant curvature of that section of the fluid path, and negative bias at the entrance effects a pressure trend to partially counteract the circulation head pressure drop from the exit of the pump member which near stall is considerably higher for the shell-stream than for the core-stream.

Figure 34:
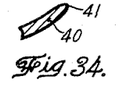
Figure 35:
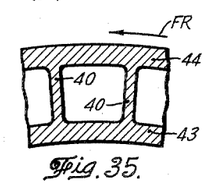

For the same reason, the blade entrance cross-sectional form near the shell-stream edge, as shown in Figure 32, is considerably thicker and more obtuse than the rather thin and tapered form near mid-stream shown in Figure 33. The range of the shock angles is largest near the core-stream edge; so, as shown in Figure 34, that entrance cross-sectional form is slightly thicker and more rounded than near mid-stream.

Figures 36, 37, 39, 40, 41, 42, 43:
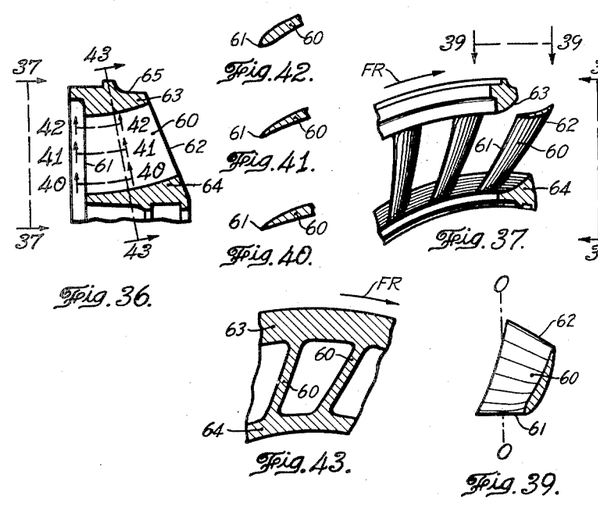
Figures 36 to 43 incl. illustrate a blade 60 for the third turbine member.

Figures 36 to 43 incl. illustrate the form features of the third turbine member blades 60, each of which extends across the fluid path from the shell shroud 64 to the core shroud 63, and curves lengthwise from a medium-size positive blade angle at the entrance tip 61 to a small positive blade angle at the exit tip 62. Figure 36 is an enlarged view of the particular section of the fluid path which, except as otherwise stated, designates the locations of the blade and channel views and cross-sections by lines bearing numbers corresponding to the figure numbers.

Figure 38:
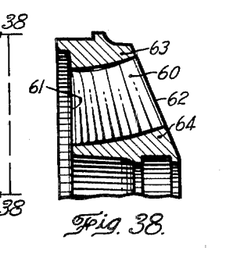

Figure 37 is a fragmentary axial view of the member looking in the channel entrances; and, as indicated by lines 38—38 and 39—39 thereof, Figure 38 is a face view and Figure 39 a top view of a blade.

Figure 43 shows the biased and somewhat trapezoidal channel shape about half-way through a channel as designated by line 43—43 of Figure 36.

The channel circumferential depth is considerably larger, and the range of shock angles tends to be slightly greater, near the core-stream edge than near the shell-stream edge. Accordingly, the blade entrance cross-sectional form is preferably maintained rather uniformly thin and tapered from near the shell-stream edge, Figure 40, to near the mid-stream, Figure 41; thence, it is gradually modified to a slightly thicker and more obtuse cross-sectional form near the core-stream edge, somewhat as illustrated in Figure 42.

Figures 44, 45, 46, 47, 48, 49, 50, 51, 52, 53, 54, 55, 56, 57, 58, 59:
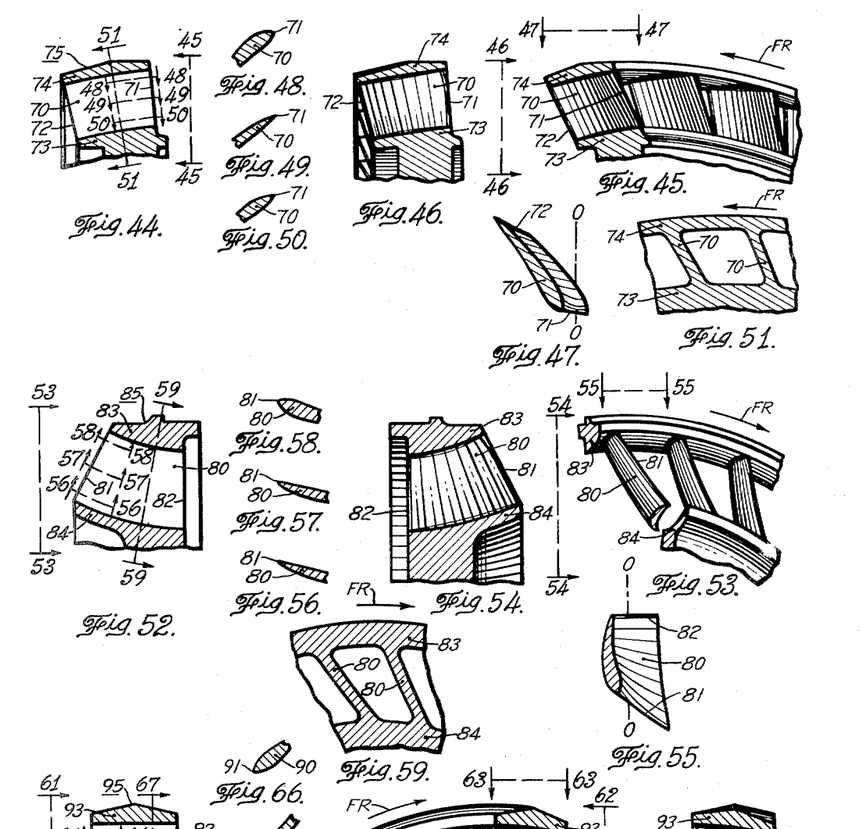
Figures 44 to 51 incl. illustrate a blade 70 for the first stator member.
Figures 52 to 59 incl. illustrate a blade 80 for the second stator member.

Figures 44 to 51 incl. illustrate the form features of the first stator member blades 70, each of which extends across the fluid path from the shell shroud 74 to the core shroud 73, and curves lengthwise from a medium-size positive blade angle at the entrance tip 71 to a large positive blade angle at the exit tip 72. Figure 44 is an enlarged view of the particular fluid path section which, except as otherwise stated, designates the locations of the blade and channel views and cross-sections by lines bearing numbers corresponding to the figure numbers.

Figure 45 is a fragmentary axial view of the particular member looking towards the channel entrances; and, as indicated by lines 46—46 and 47—47 thereof, Figure 46 is a face view and Figure 47 is a top view of a blade.

The biased and somewhat trapezoidal channel shape is illustrated, not only in the axial view of Figure 45, but also in the channel cross-section of Figure 51 at line 51—51 of Figure 44.

For most of the phases of operation, the circulation head pressure drop and the range of shock angles of the entrance are larger at the shell-stream than near mid-stream, but for part of the operation, they are slightly larger at the core-stream than near mid-stream. Accordingly, the blade entrance cross-sectional form is gradually modified from a rather thin and tapered form near mid-stream, Figure 49, to a considerably thicker and more obtuse form near the shell-stream edge as illustrated in Figure 48; and in the other direction, to a slightly thicker and more obtuse form near the core-stream edge somewhat as illustrated in Figure 50.

Figures 52 to 59 incl. illustrate the form features of the second stator member blades 80, each of which extends across the fluid path from the shell shroud 84 to the core shroud 83, and curves lengthwise from a medium-size negative blade angle at the entrance tip 81 to a small positive blade angle at the exit tip 82. Figure 52 is an enlarged view of the particular fluid path section which, except as otherwise stated, designates the locations of the blade and channel views and cross-sections by lines bearing numbers corresponding to the figure numbers.

Figure 53 is a fragmentary axial view of the particular member looking towards the channel entrances; and, as indicated by lines 54—54 and 55—55 thereof, Figure 54 is a face view and Figure 55 is a top view of a blade.

The biased and somewhat trapezoidal channel shape is illustrated, not only in the axial view of Figure 53, but also in the channel cross-section of Figure 59 at line 59—59 of Figure 52.

The channel circumferential depth is considerably larger, and the range of shock angles tends to be greater, near the core-stream edge than near the shell-stream edge. Accordingly, the blade entrance cross-sectional form is preferably maintained rather uniformily thin and tapered from near the shell-stream edge, Figure 56, to near mid-stream, Figure 57; thence, it is gradually modified to a considerably thicker and more obtuse cross-sectional form near the core-stream edge, somewhat as illustrated in Figure 58.

Figures 60 to 67 incl. show the form features of the third stator member blades 90, each of which extends across the fluid path from the shell shroud 94 to the core shroud 93, and curves lengthwise from a medium-size positive blade angle at the entrance tip 91 to a large positive blade angle at the exit tip 92. Figure 60 is an enlarged view of the particular fluid path section which, except as otherwise stated, designates the locations of the blade and channel views and cross-sections by lines bearing numbers corresponding to the figure numbers.

Figure 61 is a fragmentary axial view of the particular member looking towards the channel entrances; and, as indicated by lines 62—62 and 63—63 thereof, Figure 62 is a face view and Figure 63 is a top view of a blade.

The particular section of the fluid path is straight but is interposed between curving portions. So, the fluid tends to be received, and should be discharged, with a circulation velocity pattern which is higher along the shell-stream than along the core-stream. To partially counteract that tendency, but mainly in the entrance portion, the blade configuration has a twisting bias disposition from approximately a zero bias angle at the entrance, as shown in Figure 61, to a small positive bias angle near the exit, as indicated in the channel cross-section of Figure 67 at line 67—67 of Figure 60.

The channel circumferential depth is considerably larger, and the range of shock angles tends to be greater, near the core-stream edge than near the shell-stream edge. Accordingly, the blade entrance cross-sectional form is preferably maintained rather uniformly thin and tapered from near the shell-stream edge, Figure 64, to near mid-stream, Figure 65; thence, it is gradually modified to a considerably thicker and more obtuse cross-sectional form near the core-stream edge, somewhat as illustrated in Figure 66.

As has been indicated throughout this comprehensive exemplification of the blade configuration and the blade entrance form inventions in a torque converter, there is considerable variation of the conditions encountered along a toroidal fluid path, and each of the blade forms should be appropriate for the specific situation involved. Furthermore, the conditions differ, particularly in degree, for separate torque converter designs.

These inventions are not necessarily restricted to one array of full length blades for each member as exemplified. As is known in the art, either the pump member 35 of Figure 6, or the turbine member 55, or both, may have another array of partial length blades in the outer portions thereof, each of the partial length blades being between two full length blades, and preferably being about one-half as long. That construction affords fluid channels of more uniform circumferential depth, but without appreciably increasing the wetted blade surface, inasmuch as the number of full length blades may be reduced.

Figures 68, 69, 70, 71, 72, 73, 74, 75, 76:
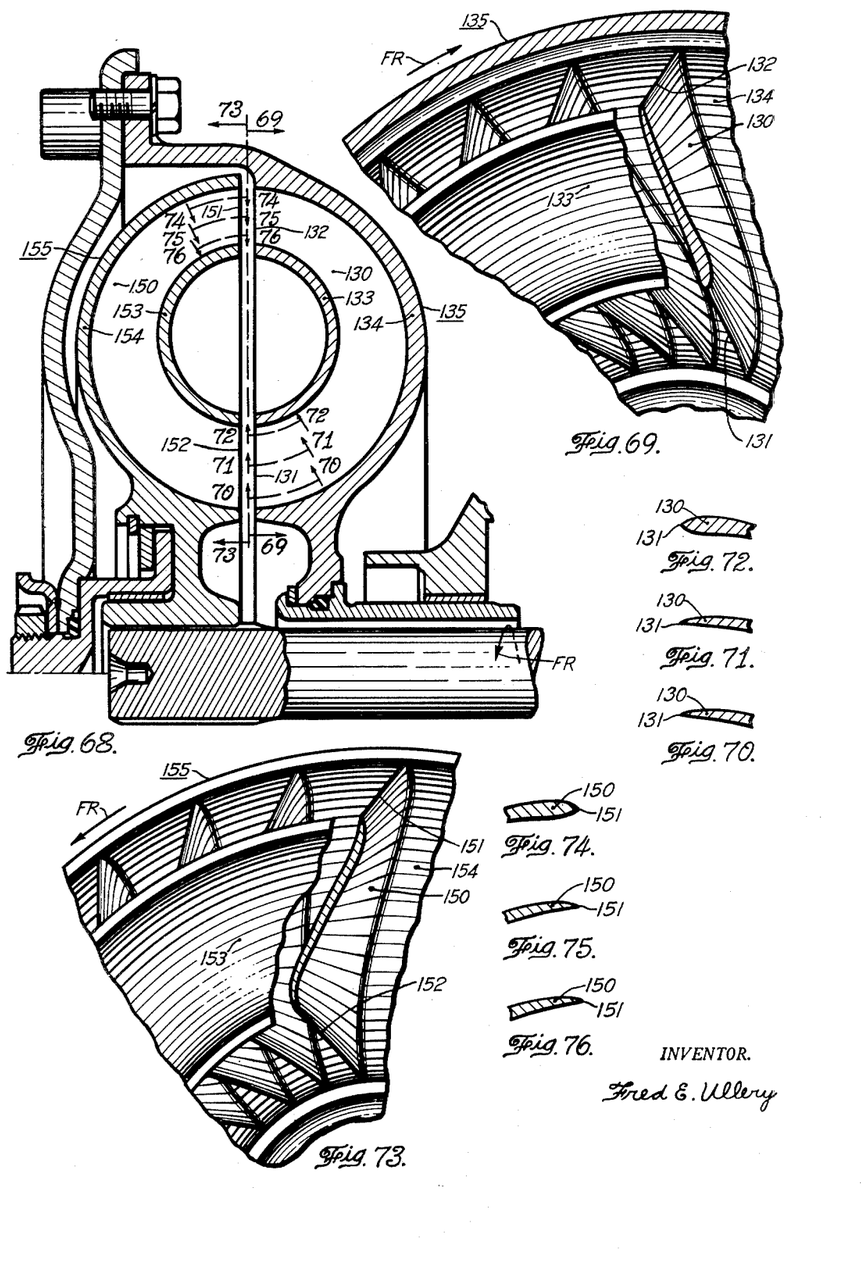

Figures 68 to 76 incl. exemplify the blade configuration and the blade entrance form inventions for the blades of the pump and the turbine members of a fluid coupling. Figure 68 is a longitudinal half-section of a fluid coupling showing the general arrangement of the pump member 135 and the turbine member 155 and their structural associations which are functionally representative of customary structural connections. Also, Figure 68 designates the locations of the blade views and cross-sections by lines bearing numbers corresponding to the figure numbers.

Each of the pump member blades 130 extends across the fluid path from the shell shroud 134 to the core shroud 133, and lengthwise curves ogee-like between zero blade angles at the entrance tip 131 and at the exit tip 132. Figure 69 is a fragmentary axial view of the pump member with a portion of the core shroud removed to show the blade configuration, for which a positive bias disposition is maintained rather uniformly from the entrance to the exit. The fluid channel cross-sectional shape is quite similar to that for the torque converter pump member heretofore illustrated; that is, Figures 26 and 27 show channel cross-sections which are representative of those of this fluid coupling pump member 135.

At the entrance, the channel circumferential depth is considerably larger, and the range of the shock angles is greater, near the core-stream edge than near the shell-stream edge. So, the blade entrance cross-sectional form is preferably maintained rather uniformly thin and tapered from near the shell-stream edge, Figure 70, to near mid-stream, Figure 71; thence, it is gradually modified to a considerably thicker and more obtuse form, somewhat as shown in Figure 72.

Each of the turbine member blades 150 extends across the fluid path from the shell shroud 154 to the core shroud 153, and lengthwise curves ogee-like between zero blade angles at the entrance tip 151 and at the exit tip 152. Figure 73 is fragmentary axial view of the turbine member with a portion of the core shroud removed to show the blade configuration for which a positive bias disposition is maintained rather uniformly from the entrance to the exit. The fluid channel cross-sectional shape is quite similar to that which was illustrated for the torque converter second turbine member; that is, Figures 17 and 18 show channel cross-sections which are representative of those of this fluid coupling turbine member 155.

At the turbine entrance, the circulation head pressure drop, as well as the range of the shock angles, is larger near the shell-stream edge than near the core-stream edge. Accordingly, as shown in Figure 76 and 75, the blade entrance cross-sectional form is maintained rather uniformly thin and tapered from near the core-stream edge to near mid-stream; thence, it is gradually modified to a thicker and more obtuse form near the shell-stream edge, somewhat as shown in Figure 74.

For fluid couplings, there is no intention of restricting these inventions to blades which have zero entrance and exit blade angles. Those angles are customary for fluid coupling blades, and are accordingly retained for these exemplifications. The ogee-like, or reversing curvature disclosed for the blades, between zero entrance and exit blade angles, is desirable to compensate for the changing axial and radial trends of the toroidal fluid path. Thus, a rather uniform blade load gradient is obtained from the entrance to the exit, not only attaining a more uniform acceleration of the fluid, but affording with the general bias disposition better guidance of the fluid around the fluid path curvature.

Figures 77, 78, 79, 80, 81, 82, 84, 85, 86, 87:
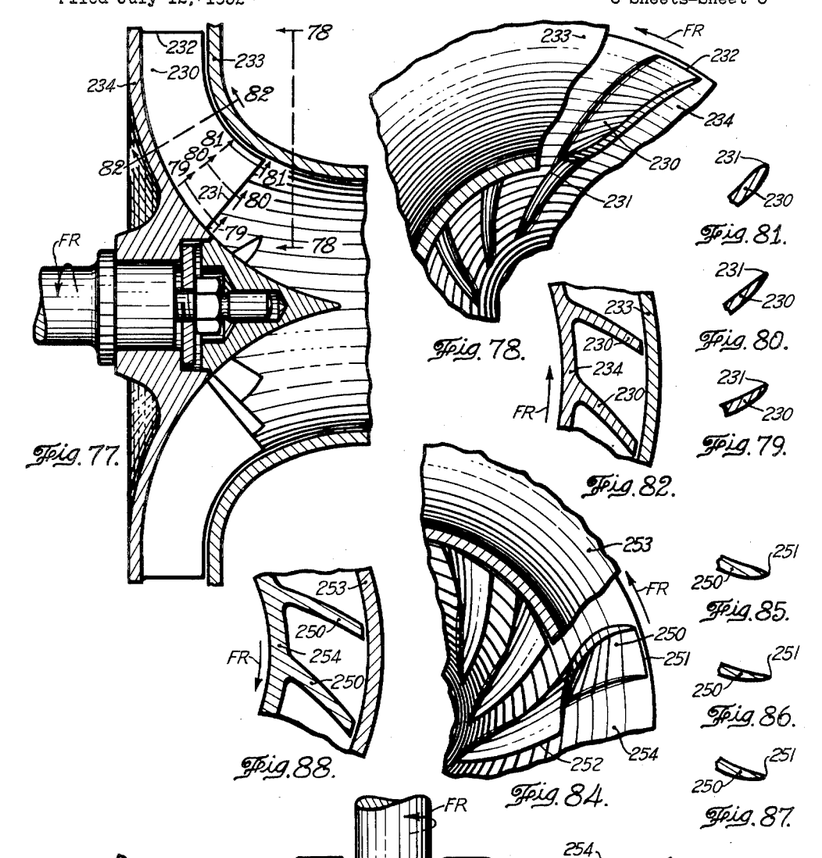
Figure 77 is a longitudinal section through the axis of rotation wherein each separate view of a blade is designated by a correspondingly numbered line.
Figure 78 is a fragmentary axial view of the pump blades 230 with part of the core shroud 233 removed.
Figures 79, 80, and 81 illustrate the pump blade entrance form, respectively, near the shell-stream edge, near mid-stream, and near the core-stream edge.
Figure 82 is a view of the channel cross-sectional shape at line 82—82 of Figure 77.
Figure 84 is a fragmentary axial view of the turbine blades 250 with part of the core shroud 253 removed.
Figures 85, 86, and 87 illustrate the turbine blade entrance form, respectively, near the shell-stream edge, near mid-stream, and near the core-stream edge; and, Figure 88 is a view of the channel cross-sectional at line 88—88 of Figure 83.

Figures 77 to 82 incl. exemplify the blade configuration and the blade entrance form inventions for the blades of the pump member of a centrifugal pump. Figure 77 is a section through the axis of rotation showing the construction somewhat diagrammatically. Figure 77 also designates the locations of the blade and channel views and cross-sections by lines bearing numbers corresponding to the figure numbers.

Each of the pump member blades 230 is attached to the shell shroud 234 and extends therefrom across the fluid path to near the core shroud 233 which is a portion of the casing; and, lengthwise each blade extends from the entrance tip 231 to the exit tip 232, the blade entrance and exit angles being medium-size angles of negative character.

Figure 78 is a fragmentary axial view with a portion of the core shroud removed to show the blade configuration and the positive bias disposition which is maintained from the entrance to the exit. The biased channel cross-sectional shape at line 82—82 of Figure 77 is illustrated in Figure 82.

To smooth out the discharge flow, the blades are preferably continued into a non-curving portion of the fluid path, as shown. Therein, the exit portion of each blade may be curved backwardly to ease off the blade load gradient. Thus, the pressure may be equalized for the opposite sides of each blade; and the bias influence, being a component of the blade load gradient, is also eased off, tending to equalize the discharge circulation velocity from all stream layers at the exit.

At the entrance, the channel circumferential depth is considerably larger near the core-stream than near the shell-stream, and the curving entrance tends to cause disparities of the flow near the shroud-streams from that near mid-stream. Therefore, the blade entrance cross-sectional form is preferably modified in both directions from that near mid-stream which normally is rather thin and tapered, somewhat as shown in Figure 80. Figure 79 shows a slightly thicker and more obtuse form near the shell-stream edge, and Figure 81 illustrates a considerably thicker and more obtuse form near the core-stream edge.

Figures 83 to 88 incl. exemplify the blade configuration and the blade entrance form inventions for the blades of the turbine member of a centripetal turbine. Figure 83 is a section through the vertical axis of rotation showing the construction somewhat diagrammatically. Figure 83 also designates the locations of the blade and channel views and cross-sections by lines bearing numbers corresponding to the figure numbers.

Each of the turbine member blades 250 is attached to the shell shroud 254 and extends therefrom across the fluid path to near the core shroud 253, which is a portion of the casing; and each blade curves lengthwise from approximately a zero blade angle at the entrance tip 251 to a large negative blade angle at the exit tip 252.

An array of guide blades 256, situated in the fluid path ahead of the turbine entrance, imparts a forward whirl velocity to the passing fluid.

Figure 84 is a fragmentary axial view with a portion of the core shroud removed to show the blade configuration and the positive bias disposition which is maintained from the entrance to the exit. The biased channel cross-sectional shape at line 88—88 of Figure 83 is illustrated in Figure 88.

To smooth out the discharge flow, the blades are preferably continued into a portion of the fluid path which, as shown, is diagonal and divergent, but is approximately straight. Therein, the curvature of the exit portion of each blade may be moderated to ease off the blade load gradient. So, somewhat as explained for the centrifugal pump blades, the pressure may be equalized for the opposite sides of each blade; and the bias influence, being a component of the blade load gradient, is also eased off, tending to equalize the discharge circulation velocity from all stream layers at the exit.

The entrance is radial and the fluid reception tends to be similar for all stream layers. So, the blade entrance cross-sectional form may properly be rather uniformly thin and tapered for all stream layers, but preferably is slightly more obtuse near the shell-stream and near the core-stream edges than near mid-stream. Figures 85, 86 and 87, respectively, illustrate the preferred entrance cross-sectional form, near the shell-stream edge, near mid-stream, and near the core-stream edge.

Obviously, the diameter of the centripetal turbine of Figure 83 may be reduced by cutting back the entrance portions of the turbine blades 250 and moving the array of guide blades 256 radially inward by that extent, those guide blades being at least partially situated in a curving portion of the fluid path. Then it would be desirable to bias each of those guide blades with a positive disposition across the fluid path; and, for the turbine blades, a thicker and more obtuse entrance cross-sectional form would be desirable near the core-stream edge.

In a preceding section titled "development of blade configuration," it was mentioned that it has been common practice to shorten a conventionally formed blade along the shell-stream edge, so as to reduce the undesirable variation range of the bias disposition. Also, some of the detrimental effects incurred thereby were explained. It is noteworthy, as shown in each of the many exemplifications, that this blade configuration invention of this specification, not only provides a more appropriate bias disposition along each blade from the entrance to the exit thereof, but permits each blade surface to be continued so that the circumferential projections of the entrance and exit extremities extend almost squarely and nearly straight across the fluid path.

*Digest*

The physical embodiment of the blade configuration invention is a novel and unique configuration of each of an array of blades of a turbo-machine extending across a portion of an annular fluid path and defining fluid channels through that portion and between the shell shroud and the core shroud thereof; that portion of the fluid path curving with changing axial and radial trends relative to the axis of rotation, and being somewhat representative of a portion of a toroidal fluid path; that configuration including a positive bias disposition, maintained across the fluid path from the blade entrance to the blade exit, to effect with the blade principal influence and the curvature of the fluid path, a pressure distribution across each channel which tends to guide the passing fluid around the fluid path curvature with less turbulence than heretofore attained; and, that bias disposition preferably including an augmentation thereof to induce, for the more prevalent operating conditions of the particular turbo-machine, a somewhat higher circulation velocity along the shell-stream than along the core-stream, so that the passing fluid is more uniformly accelerated throughout the confines of each channel.

The physical embodiment of the blade entrance form invention is a novel and unique combination or blend of known blade entrance forms, the combination having a rather thin and tapered entrance cross-sectional form near mid-stream, and gradual modifications therefrom to a considerably thicker and more obtuse cross-sectional form near at least one of the shroud-stream edges, so as to partially counteract and moderate the detrimental effect of fluid reception, near one or both of the shroud-streams, involving a wider range of shock angle and/or a greater drop of circulation head pressure than that near mid-stream.

It is evident that these inventions may be advantageously used in combination. That is, for most arrays of blades, greatest utility is attained when each blade is formed with both of these features. Also, in addition to the disclosed improvements separately attained by each of these inventions, there is a cooperative influence: the entrance form affords a more uniform and smoother reception of the fluid, enabling the blade configuration to be the more effective; and, the blade configuration discharges the fluid more consistently, so that the blade entrance form of the succeeding array of blades may be provided with more suitable features. So, both of these inventions are disclosed and claimed in this specification.

However, as has been indicated throughout this specification, each of these inventions has separate utility. That is, the blade configuration invention is advantageous for blades having conventional entrance forms, and the blade entrance form invention is advantageous for blades having conventional configurations.

These inventions are claimed, separately and in combination, for a bladed member subcombination of a turbo-machine, and for a torque converter having a pump, a turbine, and a stator member so characterized.

It is, of course, understood that the present invention is not limited to the particular forms and structures shown in the drawings, or otherwise revealed, for disclosure and explanatory purposes, but also embraces modifications within the scope of the appended claims.

I claim:

1. In a turbo-machine in which shell and core shroud elements have respective surfaces of revolution formed and arranged about a common axis so as to bound therearound an annular fluid path which has a curving trend in a cross-section cut by a plane containing said axis, a bladed member which occupies at least an annular portion of said annular fluid path and thereat comprises: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of a plurality of said blades include across said fluid path a blade surface of configuration disposition which across a mid-stream path midway between said shell-stream edge and said core-stream edge is a bias disposition for which at each point along said mid-stream path from the blade entrance end to the blade exit end the bias angle is vectorially positive and has a magnitude of at least 10 degrees.

2. The combination defined in claim 1 wherein said bias disposition renders said blades so characterized operative with said utilitarian blade action to induce, across said fluid path in the direction of said bias disposition from shell-stream edge to said core-stream edge, an increasing trend of fluid pressure which serves to sustain in general prevalence between said blade entrance and exit ends a fluid flow pattern having a higher flow velocity along said shell-stream edge than along said core-stream edge.

3. The combination defined in claim 1 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

4. The combination defined in claim 1 in which each of said blades characterized with said bias disposition has its said surface of configuration disposition maintained uniform across said fluid path from its said entrance end to its said exit end to the extent that its bias angle range of variation is less than 30 degrees.

5. The combination defined in claim 4 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

6. The combination defined in claim 4 wherein said bias disposition renders said blades so characterized operative with said utilitarian blade action to induce, across said fluid path in the direction of said bias disposition from said shell-stream edge to said core-stream edge, an increasing trend of fluid pressure which serves to sustain in general prevalence between said blade entrance and exit ends a fluid flow pattern having a higher flow velocity along said shell-stream edge than along core-stream edge.

7. The combination defined in claim 6 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

8. In a hydrodynamic torque converter in which shell and core shroud elements have respective surfaces of revolution formed and arranged about a common axis so as to bound therearound a toroidal fluid path, a combination comprising at least a pump member, a turbine member and a stator member in which each of those members occupies a respective annular portion of said toroidal fluid path and thereat includes: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of three stated members, a said pump, a said turbine and a said stator, in its respective annular portion of said fluid path and thereacross for each of a plurality of its said blades, include a blade surface of configuration disposition which across a mid-stream path midway between said shell-stream edge and said core-stream edge is a bias disposition for which at each point along said mid-stream path from the blade entrance end to the blade exit end the bias angle is victorially positive and has a magnitude of at least 10 degrees.

9. The combination defined in claim 8 wherein said bias disposition renders said blades so characterized operative with said utilitarian blade action to induce, across said fluid path in the direction of said bias disposition from said shell-stream edge to said core-stream edge, an increasing trend of fluid pressure which serves to sustain in general prevalence between said blade entrance and exit ends a fluid flow pattern having a higher flow velocity along said shell-stream edge than along said core-stream edge.

10. The combination defined in claim 8 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

11. The combination defined in claim 8 in which each of said blades characterized with said bias disposition has its said surface of configuration disposition maintained uniform across said fluid path from its said entrance end to its said exit end to the extent that its bias angle range of variation is less than 30 degrees.

12. The combination defined in claim 11 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

13. The combination defined in claim 11 wherein said bias disposition renders said blades so characterized operative with said utilitarian blade action to induce, across said fluid path in the direction of said bias disposition from said shell-stream edge to said core-stream edge, an increasing trend of fluid pressure which serves to sustain in general prevalence between said blade entrance and exit ends a fluid flow pattern having a higher flow velocity along said shell-stream edge than along said core-stream edge.

14. The combination defined in claim 13 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

15. In a turbo-machine in which shell and core shroud elements have respective surfaces of revolution formed and arranged about a common axis so as to bound therearound an annular fluid path which has a curving trend in a cross-section cut by a plane containing said axis, a bladed member which occupies at least an annular portion of said annular fluid path and thereat comprises: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of a plurality of said blades include across said fluid path a blade entrance end formation conformed with entrance cross-sectional forms which include a thin and tapered mid-stream form midway between said shell-stream edge and said core-stream edge, a first edge form which is thicker and more obtuse than said mid-stream form, and a second edge form relative to which said mid-stream form is at least as thin and as acute, said first edge form being near one and said second edge form being near the other of two said stream edges.

16. The combination defined in claim 15 wherein, with regard to said blade entrance end formation of each said blade so characterized: said first edge form is near said core-stream edge; and said second edge form is near said shell-stream edge, and thereat, is a thin and tapered form which is approximately the same as said mid-stream form.

17. The combination defined in claim 15 wherein, with regard to said blade entrance end formation of each said blade so characterized: said first edge form is near said core-stream edge; and said second edge form is near said shell-stream edge, and thereat, is a thicker and more obtuse form than said mid-stream form.

18. In a hydrodynamic torque converter in which shell and core shroud elements have respective surfaces of revolution formed and arranged about a common axis so as to bound therearound a toroidal fluid path, a combination comprising at least a pump member, a turbine member and a stator member in which each of those members occupies a respective annular portion of said toroidal fluid path and thereat includes: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of three stated members, a said pump, a said turbine and a said stator, in its respective annular portion of said fluid path and thereacross for each of a plurality of its said blades, include a blade entrance end formation conformed with entrance cross-sectional forms which include a thin and tapered mid-stream form midway between said shell-stream edge and said core-stream edge, a first edge form which is thicker and more obtuse than said mid-stream form, and a second edge form relative to which said mid-stream form is at least as thin and as acute, said first edge form being near one and said second edge form being near the other of the two said stream edges.

19. The combination defined in claim 18 wherein, with regard to said blade entrance end formation of each said blade so characterized in one of the three stated members: said first edge form is near said core-stream edge; and said second edge form is near said shell-stream edge, and thereat, is a thin and tapered form which is approximately the same as said mid-stream form.

20. The combination defined in claim 18 wherein, with regard to said blade entrance end formation of each said blade so characterized in one of the three stated members: said first edge form is near said core-stream edge; and said second edge form is near said shell-stream edge, and thereat, is a thicker and more obtuse form than said mid-stream form.

21. In a turbo-machine in which shell and core shroud elements have respective surfaces of revolution formed and arranged about a common axis so as to bound therearound an annular fluid path which has a curving trend in a cross-section cut by a plane containing said axis, a bladed member which occupies at least an annular portion of said annular fluid path and thereat comprises: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of a plurality of said blades include across said fluid path a blade surface of configuration disposition which across a mid-stream path midway between said shell-stream edge and said core-stream edge is a bias disposition for which at each point along said mid-stream path from the blade entrance end to the blade exit end the bias angle is vectorially positive and has a magnitude of at least 10 degrees, and a blade entrance end formation conformed with entrance cross-sectional forms which include a thin and tapered mid-stream form at said mid-stream path, a first edge form which is thicker and more obtuse than said mid-stream form, and a second edge form relative to which said mid-stream form is at least as thin and as acute, said first edge form being near one and said second edge form being near the other of the two said stream edges.

22. The combination defined in claim 21 wherein, with regard to said blade entrance end formation of each said blade so characterized: said first edge form is near said core-stream edge; and said second edge form is near said shell-stream edge, and thereat, is a thin and tapered form which is approximately the same as said mid-stream form.

23. The combination defined in claim 21 wherein, with regard to said blade entrance end formation of each said blade so characterized: said first edge form is near said core-stream edge; and said second edge form is near said shell-stream edge, and thereat, is a thicker and more obtuse form than said mid-stream form.

24. The combination defined in claim 21 wherein said bias disposition renders said blades so characterized operative with said utilitarian blade action to induce, across said fluid path in the direction of said bias disposition from said shell-stream edge to said core-stream edge, an increasing trend of fluid pressure which serves to sustain in general prevalence between said blade entrance and exit ends a fluid flow pattern having a higher flow velocity along said shell-stream edge than along said core-stream edge.

25. The combination defined in claim 21 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

26. The combination defined in claim 21 in which each of said blades characterized with said bias disposition has its said surface of configuration disposition maintained uniform across said fluid path from its said entrance end to its said exit end to the extent that its bias angle range of variation is less than 30 degrees.

27. In a hydrodynamic torque converter in which shell and core shroud elements have respective surfaces of revolution formed and arranged about a common axis so as to bound therearound a toroidal fluid path, a combination comprising at least a pump member, a turbine member and a stator member in which each of those members occupies a respective annular portion of said toroidal fluid path and thereat includes: an annular array of blades circumferentially distributed in said fluid path around said axis, each of said blades being disposed with a blade surface of configuration thereof spanning across said fluid path from a shell-stream edge which conforms with said shell shroud surface of revolution to a core-stream edge which conforms with said core shroud surface of revolution and thereacross extending along said fluid path in the direction of fluid flow from a blade entrance end to a blade exit end; and, blade support means connecting said blades together in circumferentially spaced and fixed relationship with each other, said blade support means being adapted to transmit torque concurrent with utilitarian blade action change of moment of momentum of passing fluid; and in which, the blade features of each of three stated members, a said pump, a said turbine and a said stator, in its respective annular portion of said fluid path and thereacross for each of a plurality of its said blades, include a blade surface of configuration disposition which across a mid-stream path midway between said shell-stream edge and said core-stream edge is a bias disposition for which at each point along said mid-stream path from the blade entrance end to the blade exit end the bias angle is vectorially positive and has a magnitude of at least 10 degrees, and a blade entrance end formation conformed with entrance cross-sectional forms which include a thin and tapered mid-stream form at said mid-stream path, a first edge form which is thicker and more obtuse than said mid-stream form, and a second edge form relative to which said mid-stream form is at least as thin and as acute, said first edge form being near one and said second edge form being near the other of the two said stream edges.

28. The combination defined in claim 27 wherein, with regard to said blade entrance end formation of each said blade so characterized in one of the three stated members: said first edge form is near said core-stream edge; and said second edge form is near said shell-stream edge, and thereat, is a thin and tapered form which is approximately the same as said mid-stream form.

29. The combination defined in claim 27 wherein, with regard to said blade entrance end formation of each said blade so characterized in one of the three stated members: said first edge form is near said core-stream edge; and said second edge form is near said shell-stream edge, and thereat, is a thicker and more obtuse form than said mid-stream form.

30. The combination defined in claim 27 wherein said bias disposition renders said blades so characterized operative with said utilitarian blade action to induce, across said fluid path in the direction of said bias disposition from said shell-stream edge to said core-stream edge, an increasing trend of fluid pressure which serves to sustain in general prevalence between said blade entrance and exit ends a fluid flow pattern having a higher flow velocity along said shell-stream edge than along said core-stream edge.

31. The combination defined in claim 27 in which each of said blades characterized with said bias disposition has at each of its ends, said entrance end and said exit end, a respective extremity contour which by rotation about said axis generates a surface of revolution of such form and disposition across said fluid path that, in a plane which contains said axis and cuts a radial cross-section of said fluid path, the intersection of that surface of revolution is a line which is approximately straight and lies almost squarely across said fluid path.

32. The combination defined in claim 27 in which each of said blades characterized with said bias disposition has its said surface of configuration disposition maintained uniform across said fluid path from its said entrance end to its said exit end to the extent that its bias angle range of variation is less than 30 degrees.

References Cited in the file of this patent

UNITED STATES PATENTS

| | | |
|---|---|---|
| 2,046,703 | Sinclair | July 7, 1936 |
| 2,306,639 | Miller | Dec. 29, 1942 |
| 2,306,758 | Schneider et al. | Dec. 29, 1942 |
| 2,351,517 | Jandasek | June 13, 1944 |
| 2,371,588 | Salerni | Mar. 13, 1945 |
| 2,381,187 | Swift | Aug. 7, 1945 |
| 2,410,185 | Schneider et al. | Oct. 29, 1946 |
| 2,418,362 | Miller | Apr. 1, 1947 |
| 2,481,541 | Schneider | Sept. 13, 1949 |